(12) United States Patent
Asada

(10) Patent No.: US 6,929,089 B2
(45) Date of Patent: Aug. 16, 2005

(54) ELECTRICALLY DRIVEN STEERING APPARATUS

(75) Inventor: Atsuhisa Asada, Obu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/793,924

(22) Filed: Mar. 8, 2004

(65) Prior Publication Data

US 2004/0188172 A1 Sep. 30, 2004

(30) Foreign Application Priority Data

Mar. 28, 2003 (JP) ........................................ 2003-090338

(51) Int. Cl.$^7$ ................................................. B62D 5/04
(52) U.S. Cl. ........................... 180/446; 180/444; 701/41
(58) Field of Search ................................ 180/446, 444, 180/443; 701/41

(56) References Cited

U.S. PATENT DOCUMENTS

| | | | |
|---|---|---|---|
| 5,442,956 A | * 8/1995 | Persson | 73/118.1 |
| 6,175,231 B1 | * 1/2001 | Budaker et al. | 324/173 |
| 6,250,420 B1 | * 6/2001 | Brenner et al. | 180/443 |
| 2002/0040531 A1 | 4/2002 | Schodlbauer | |

FOREIGN PATENT DOCUMENTS

| | | |
|---|---|---|
| DE | 197 12 869 | 10/1998 |
| EP | 1 291 264 | 3/2003 |

* cited by examiner

*Primary Examiner*—Tony Winner
(74) *Attorney, Agent, or Firm*—Oblon, Spivak, McClelland, Maier & Neustadt, P.C.

(57) ABSTRACT

An electrically driven steering apparatus is capable of continuing to detect a steering angle even if a rotation angle sensor is in trouble. The steering angle is acquired using three rotation angle sensors (first resolver 35, second resolver 37, motor resolver 44). Thus, even if any resolver is in trouble, the steering angle can be detected continuously and by maintaining the functions of ABS, VSC and the like, the safety in traveling can be intensified.

3 Claims, 10 Drawing Sheets

Fig. 6
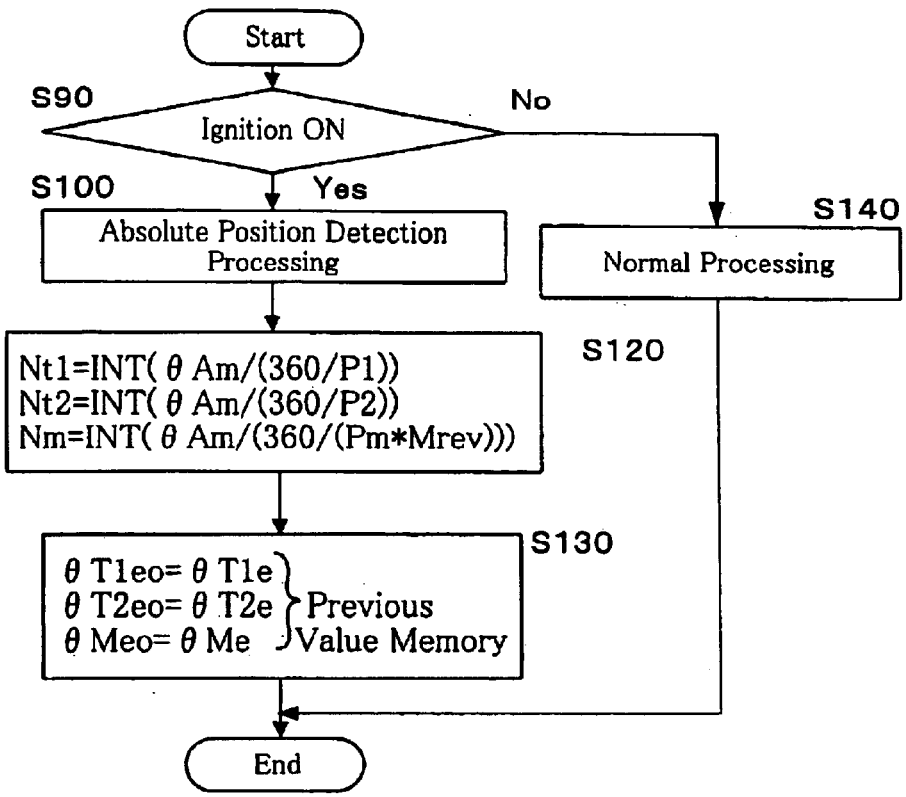
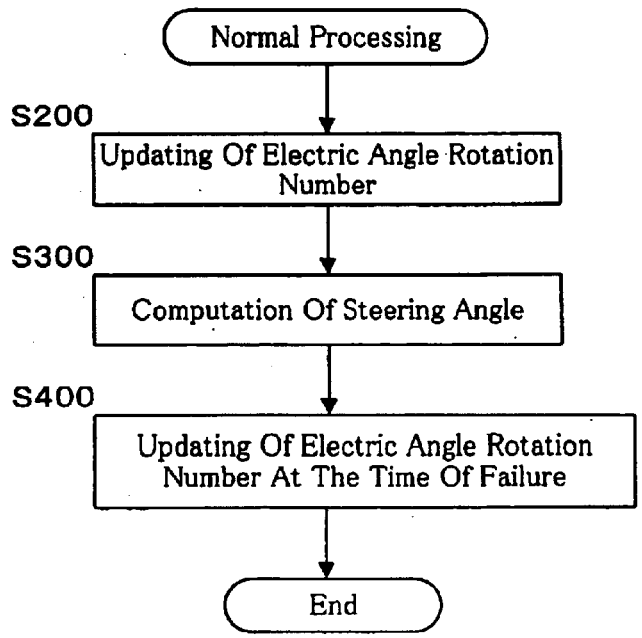

ELECTRICALLY DRIVEN STEERING APPARATUS

CROSS-REFERENCE TO RELATED APPLICATION

The present application claims priority under 35 U.S.C. §119 to Japanese Patent Application No. JP2003-090338. The content of the application is incorporated herein by reference.

BACKGROUND OF THE INVENTION

1. Field of the Invention

The present invention relates to an electrically driven steering apparatus which provides its steering mechanism with an assist force by a motor and more particularly to an electrically driven steering apparatus capable of detecting a steering angle using a rotation angle sensor.

2. Description of the Related Art

Conventionally, an electrically driven steering apparatus which reduces a steering force through a steering wheel by providing the steering mechanism connected to a steering shaft with an assist force by a motor has been well known. Because in such an electrically drive steering apparatus, the steering wheel is rotated within a finite revolution number of more than one turn in the right or left direction, at what degree the steering wheel is located in the right or left direction from a neutral position of the steering wheel, which is determined in a condition that a vehicle travels straight, is recognized as an absolute position by a sensor. If this absolute position is used by the rotation angle sensor provided on the steering wheel, for example when a half rotation state (180°) is detected, it is impossible to specify whether the steering wheel is rotated by a half turn to the right side (+180°) from the neutral position or rotated by one and a half turns to the right side (+540°) or rotated by a half turn to the left side (−180°) or rotated by one and a half turns to the left (−540°). Thus, the absolute position is determined by incrementing (+360° when it is rotated a single turn to the right) or decrementing (−360° when it is rotated a single turn to the left) the rotation number of the steering wheel each time when the steering wheel is rotated by a single turn.

At the time of ignition ON, the above-described method is not capable of detecting the absolute position because the rotation number of the steering wheel is not clear. In this case, the absolute position is detected by using plural rotation angle sensors. That is, attention is paid to that the motor for generating the assist force utilizes a resolver (rotation angle sensor) as a means for detecting a motor rotation position while another resolver is used as a means also for detecting the steering torque of the steering wheel and then, the absolute position of the steering wheel can be detected by computing signals outputted from plural resolvers and having linearity to the rotation angle. This computation of the absolute position by arithmetic operation is carried out at the time of ignition ON and after that, the absolute position is obtained with the rotation angle sensor which increments or decrements the rotation number when the steering wheel is rotated by a single turn.

[Prior Art]

JP2003-75109 A is incorporated herein by reference.

However, if the rotation angle sensor for obtaining the absolute position (steering angle) is in trouble, not only the steering assistance by the motor is stopped but also detection of the steering angle is disabled immediately, so that, for example, vehicle stability control (VSC) which is achieved by using the steering angle is made inactive either.

SUMMARY OF THE INVENTION

The present invention has been achieved to solve the above-described problem and therefore, an object of the present invention is to provide an electrically driven steering apparatus capable of continuing to detect the steering angle even if any one rotation angle sensor is in trouble.

An electrically driven steering apparatus according to the present invention is comprising: a steering wheel; a first rotation angle sensor for detecting a rotation angle of a steering shaft connected to the steering wheel; a second rotation angle sensor for determining an assist amount; a motor for assisting steering operation by a steering mechanism connected to said steering shaft; and a third rotation angle sensor for detecting the rotation angle of the motor, wherein a steering angle is acquired according to each of rotation angles detected from at least two of said first rotation angle sensor, said second rotation angle sensor and said third rotation angle sensor, and majority operation is executed based on the rotation angles detected by said first rotation angle sensor, said second rotation angle sensor and said third rotation angle sensor and one of the acquired steering angles is selected based on the result of the majority operation.

Because in the electrically driven steering apparatus according to a first aspect of the present invention, each steering angle is acquired using plural rotation angle sensors, detection of the steering angle can be continued even if any one rotation angle sensor gets into a trouble. By maintaining the functions of the ABS, VSC and the like, the safety in traveling can be intensified. Further, the majority operation is executed based on the rotation angle detected by the three rotation angle sensors and the steering angle and the steering angle is selected depending on the result of the majority operation, thereby the reliability on the steering angle being intensified.

An electrically driven steering apparatus according to the present invention is comprising: a steering wheel; a first rotation angle sensor for detecting the rotation angle of a steering shaft connected to the steering wheel; a second rotation angle sensor for detecting the rotation angle of said steering shaft through an elastic member; a motor for assisting the steering by the steering mechanism connected to said steering shaft; and a third rotation angle sensor for detecting the rotation angle of the motor, so as to control said motor by determining an assist amount from a difference between the rotation angle detected by the first rotation angle sensor and the rotation angle detected by the second rotation angle sensor, wherein each steering angle is acquired from the rotation angles detected from said first rotation angle sensor, said second rotation angle sensor and said third rotation angle sensor and majority operation is executed based on the steering angles acquired by said first rotation angle sensor, said second rotation angle sensor and said third rotation angle sensor and any one of said steering angles is selected as a result of the majority operation.

Because in the electrically driven steering apparatus according to a second aspect of the present invention, each steering angle is acquired using three rotation angle sensors, detection of the steering angle can be continued even if any one rotation angle sensor gets into a trouble. By maintaining the functions of the ABS, VSC and the like, the safety in traveling can be intensified. Further, because the majority operation is executed based on the steering angle detected by the three rotation angle sensors and the steering angle is selected as a result of the majority operation, whether or not the function of the rotation angle sensor is appropriate can be always determined thereby the reliability on the steering angle being intensified.

An electrically driven steering apparatus according to the present invention is comprising: a steering wheel; a first rotation angle sensor for detecting the rotation angle of a steering shaft connected to the steering wheel; a second rotation angle sensor for detecting the rotation angle of said steering shaft through an elastic member; a motor for assisting the steering by the steering mechanism connected to said steering shaft; and a third rotation angle sensor for detecting the rotation angle of the motor, so as to control said motor by determining an assist amount from a difference between the rotation angle detected by the first rotation angle sensor and the rotation angle detected by the second rotation angle sensor, wherein a steering angle is acquired from the rotation angle detected by said first rotation angle sensor and said second rotation angle sensor and a counted rotation number of the steering wheel while a steering angle is acquired from the rotation angle detected by said third rotation angle sensor and a counted rotation number of the motor; the majority operation is executed based on the steering angle acquired by said first rotation angle sensor, said second rotation angle sensor and said third rotation angle sensor so as to determine whether or not the rotation angle sensor is appropriate while one of said steering angles is selected as a result of the majority operation; and a steering angle is acquired from the rotation angle detected by the rotation angle sensor and the rotation number corresponding to the steering angle selected as the result of said majority operation for the rotation sensor determined to be inappropriate.

In the electrically driven steering apparatus according to a third aspect of the present invention, each steering angle is acquired based on the rotation angle and rotation number of each of the first rotation angle sensor, the second rotation angle sensor and the third rotation angle sensor and then, any one steering angle is selected from the result of the majority operation based on the acquired steering angles. Thus, even if any one rotation angle sensor gets into trouble, detection of the steering angle can be continued. Further, because the steering angle is selected from the steering angles detected by the three rotation angle sensors through the majority operation, whether or not the function of the rotation angle sensor is appropriate can be always determined, thereby the reliability on the steering angle being intensified. Additionally, for a rotation angle sensor determined to be inappropriate, the steering angle is obtained using the rotation number corresponding to the steering angle selected based on the result of the majority operation as well as the rotation angle detected by the rotation angle sensor. Thus, even if the rotation number being counted temporarily by any one rotation angle sensor becomes unclear due to break down in a moment because of contact failure or the like, the steering angle can be obtained continuously by using a rotation number corresponding to a steering angle selected from the result of the majority operation. Thus, the steering angle can be obtained appropriately by restarting the counting of the rotation number after a restoration. Therefore, even if any rotation angle sensor fails to operate in a moment, an assist amount can be determined appropriately if the rotation angle sensor in trouble is restored to a normal state, so that control on the motor can be restarted. Further, because the majority operation can be executed by using all the three rotation angle sensors, the reliability of the steering angle never drops.

BRIEF DESCRIPTION OF THE DRAWINGS

FIG. 6(A) is a flow chart showing the steering angle arithmetic operation processing to be carried out by the CPU shown in FIG. 4 and FIG. 6(B) is a flow chart of ordinary processing during the steering angle arithmetic operation processing shown in FIG. 6(A);

DESCRIPTION OF THE PREFERRED EMBODIMENTS

Hereinafter, the electrically driven steering apparatus of the present invention, its manufacturing method and manufacturing apparatus will be described with reference to the accompanying drawings.

Figure 1:
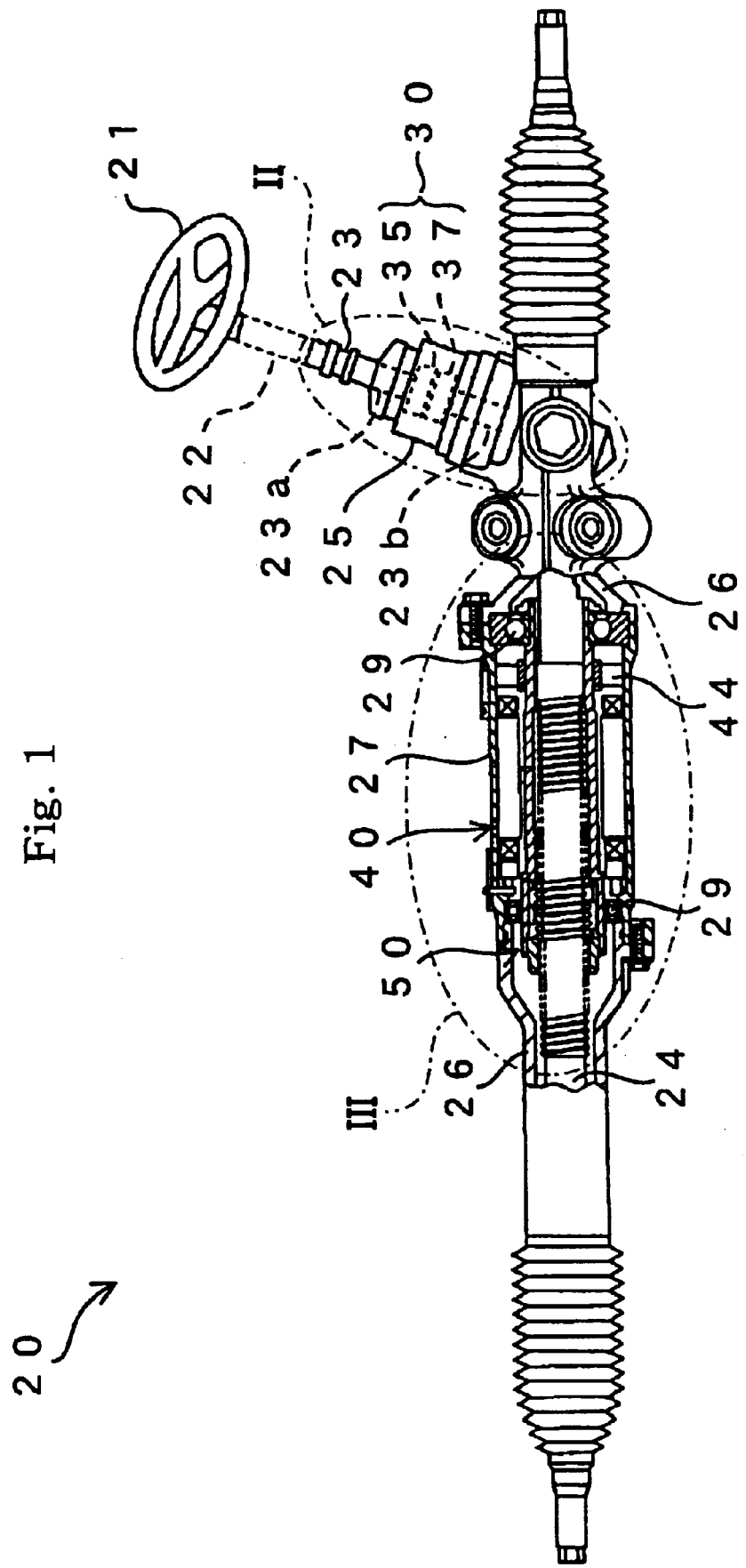
FIG. 1 is a diagram showing the structure of the electrically driven steering apparatus according to an embodiment of the present invention.

First, the main structure of the electrically driven steering apparatus 20 of this embodiment will be described with reference to FIGS. 1–4. As shown in FIGS. 1, 4, the electrically driven steering apparatus 20 comprises mainly a steering wheel 21, a steering shaft 22, a pinion shaft 23, a rack shaft 24, a torque sensor 30, a motor 40, a motor resolver 44, ball screw mechanism 50, ECU 60 and the like. This structure detects the steering condition of the steering wheel 21 and assists the steering operation of a vehicle driver by generating an assist force corresponding to that steering condition by means of the motor 40. In the meantime, vehicle wheels (not shown) are connected to both ends of the rack shaft 24 through a tie-rod or the like.

Figure 2:
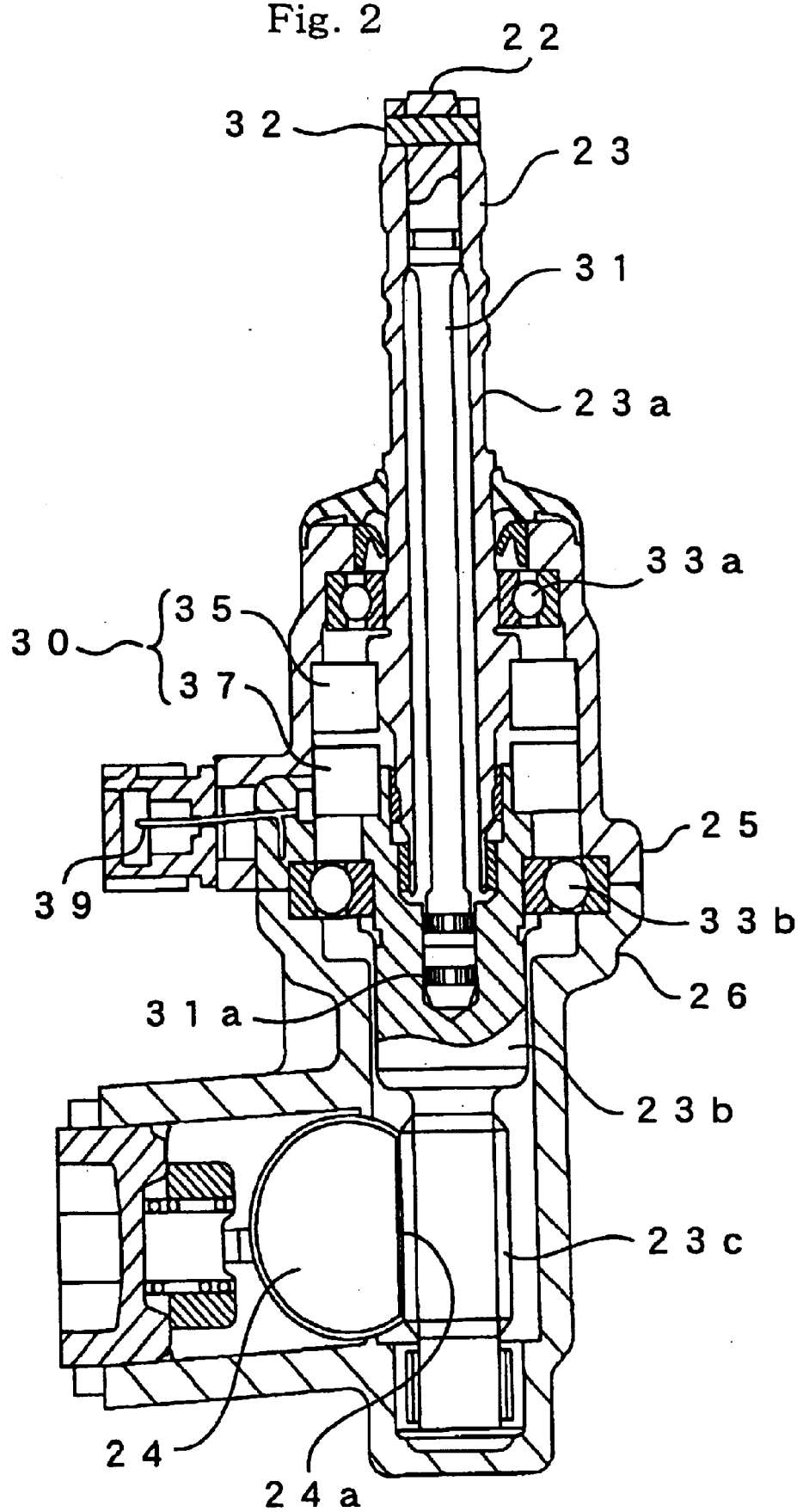
FIG. 2 is an enlarged view of an area within an ellipse made by a dot and dash line II shown in FIG. 1.

As shown in FIGS. 1, 2, the steering wheel 21 is connected to one end of the steering shaft 22 and the other end of this steering shaft 22 is connected to an input shaft 23a of the torque sensor 30 accommodated in a pinion housing 25 and the torsion bar 31 through each pin 32. Further, the output shaft 23b of the pinion 23 is connected to the other end of 31a of the torsion bar 31 through spline coupling.

The input shaft 23a of this pinion shaft 23 is supported rotatably by a bearing 33a and an output shaft 23b thereof is supported rotatably by a bearing 33b in the pinion housing 25. A first resolver 35 is provided between the input shaft 23a and the pinion housing 25 and a second resolver 37 is provided between the output shaft 23b and pinion housing 25. The first resolver 35 and second resolver 37 are capable of detecting a steering angle by the steering wheel 21 and connected electrically to the ECU 60 through a terminal 39 (see FIG. 4).

A pinion gear 23c is formed at an end section of the output shaft 23b of the pinion shaft 23 and a rack groove 24a in the rack shaft 24 engages with this pinion gear 23c. Consequently, rack and pinion mechanism is constructed.

With such a structure, the steering shaft 22 and the pinion shaft 23 can be connected such that they can rotate with respect to each other through the torsion bar 31 and the rotation angle of the steering shaft 22, that is, the rotation angle (mechanical angle) θTm of the steering wheel 21 can be detected based on a first steering angle (electric angle) θT1e by the first resolver 35 and a second steering angle (electric angle) θT2e by the second resolver 37. Additionally, the torsion amount (corresponding to the steering torque) of the torsion bar 31 can be detected from a difference in angle between the first steering angle θT1e and the second steering angle θT2e as a torsion angle.

Figure 3:
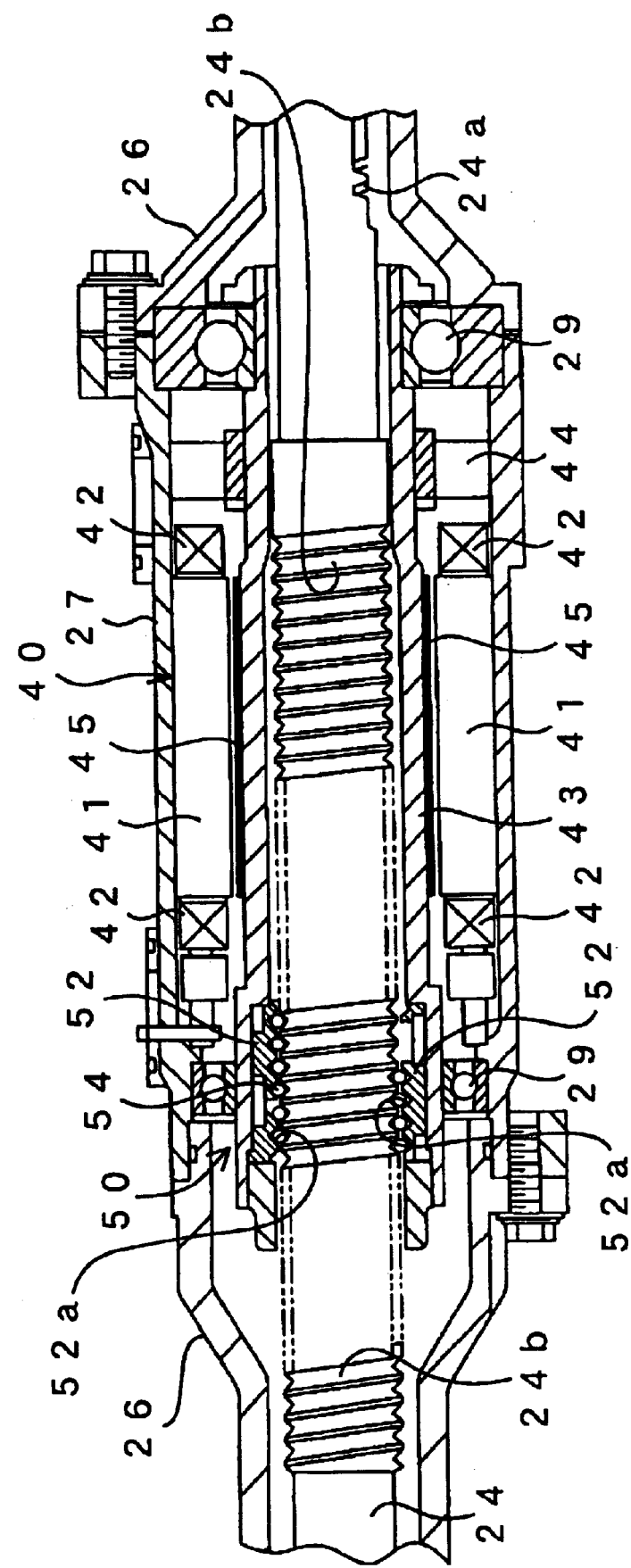
FIG. 3 is an enlarged view of an area within an ellipse made by a dot and dash line III shown in FIG. 1.
Figure 4:
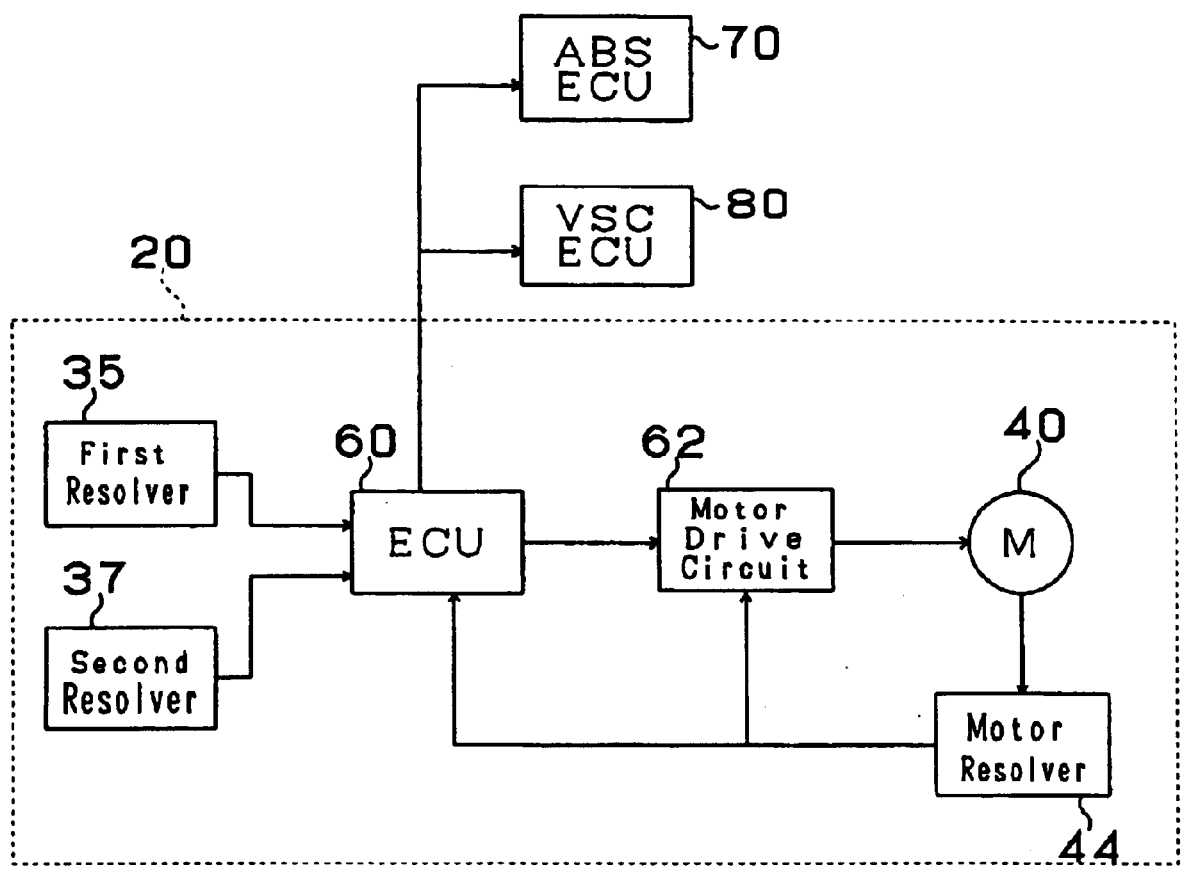
FIG. 4 is a block diagram showing the connecting structure of the ECU and resolver for controlling the electrically driven steering apparatus of this embodiment.

As shown in FIGS. 1, 3, the rack shaft 24 is accommodated in the rack housing 26 and motor housing 27. A ball screw groove 24b is formed spirally in its intermediate section. A cylindrical motor shaft 43 is provided around this ball screw groove 24b such that it is supported by a bearing 29 rotatably coaxially with the rack shaft 24. This motor shaft 43 constructs the motor 40 together with a stator 41, an excitation coil 42 and the like. Magnetic field generated by the excitation coil 42 wound around the stator 41 acts upon a permanent magnet 45 provided on the outer circumference of the motor shaft 43, which corresponds to a rotor, so that the motor shaft 43 can be rotated.

A ball screw nut 52 is installed on the inner periphery of the motor shaft 43 and a ball screw groove 52a is formed spirally in this ball screw nut 52 also. Consequently, ball screw mechanism 50 can be constructed which enables the rack shaft 24 to be moved in the axial direction by a rotation of the motor shaft 43 by imposing a plurality of balls 54 between the ball screw groove 52a in this ball screw nut 52 and the ball screw groove 24b in the rack shaft 24.

That is, the ball screw mechanism 50 constituted of both the ball screw grooves 24b, 52a and the like can convert the rotation torque of rotations in the normal direction and reverse direction of the motor shaft 43 to a reciprocation in the axial direction of the rack shaft 24. Consequently, this reciprocation is converted to an assist force capable of reducing the steering force of the steering wheel 21 through the pinion shaft 23 which constructs the rack and pinion mechanism together with the rack shaft 24.

A motor resolver 44 capable of detecting a rotation angle (electric angle) θMe of the motor shaft 43 is provided between the motor shaft 43 of the motor 40 and the motor housing 27. This motor resolver 44 is connected electrically to the ECU 60 through a terminal (not shown) (see FIG.4).

FIG. 4 shows the control configuration of the electrically driven steering apparatus 20 according to the first embodiment. If the outputs of the first resolver 35 and second resolver 37 are inputted to the ECU 60 of the electrically driven steering apparatus 20, the ECU 60 computes a steering torque T and outputs an assist instruction for assisting the steering force corresponding to the steering torque T to the side of the motor drive circuit 62 as described later. The motor drive circuit 62 generates a torque corresponding to the assist instruction in the motor 40. The rotation angle of the motor 40 is detected by the motor resolver 44 and fed back to the motor drive circuit 62 while outputted to the ECU 60. As described later, the ECU 60 computes each steering angle based on the outputs from the first resolver 35, the second resolver 37 and the motor resolver 44 and corrects the assist force for the above-described steering force corresponding to the steering angle. The ECU 60 of the electrically driven steering apparatus 20 outputs the computed steering angle to the ECU 70 for ABS control and the ECU 80 for VSC control. Corresponding to this steering angle, the ECU 70 for the ABS control realizes the ABS control and the ECU 80 for the VSC control realizes the VSC control.

Figure 5:
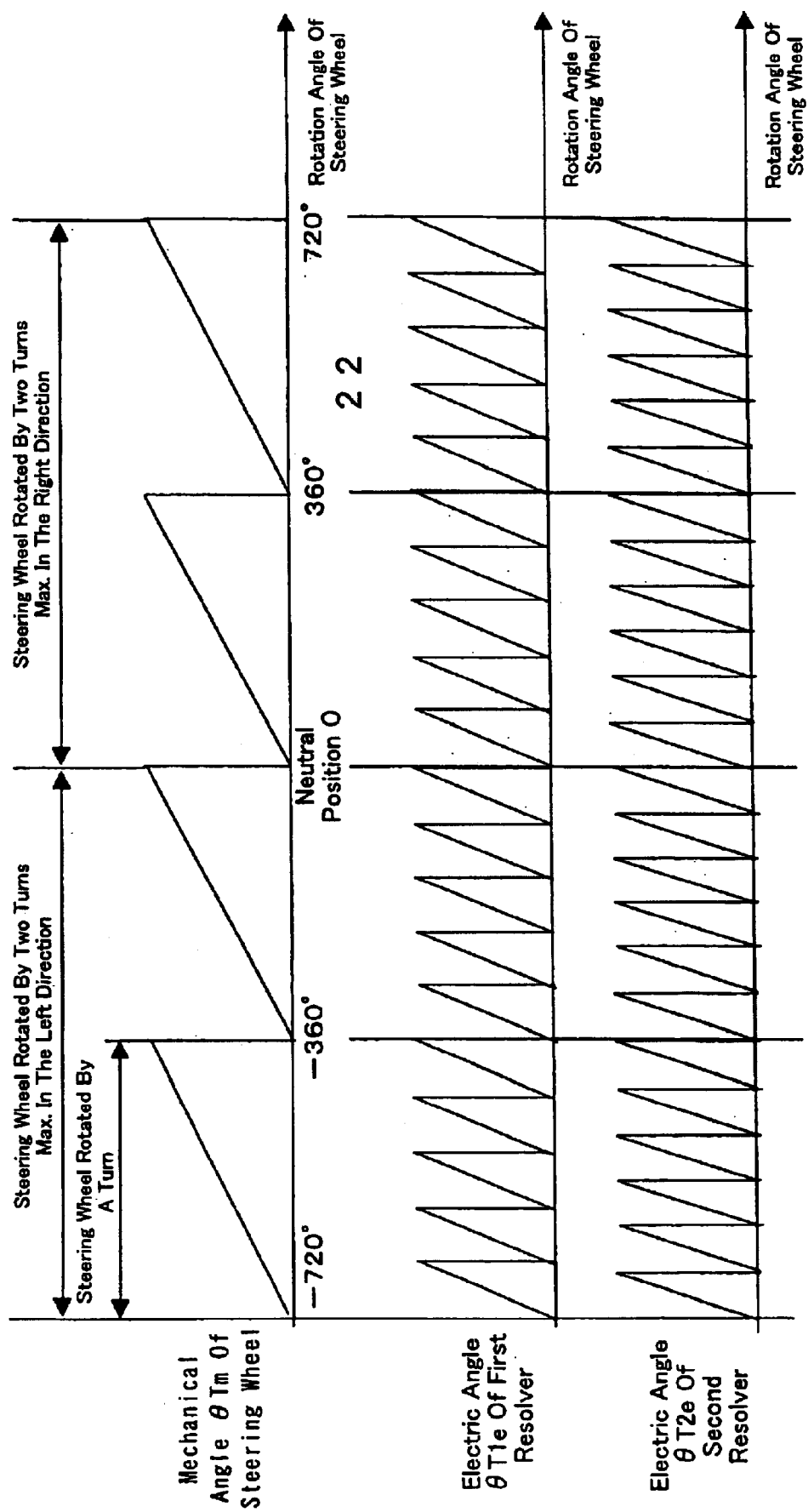
FIG. 5 is a characteristic diagram showing resolver output signals by the first resolver and second resolver to the rotation angle of the steering wheel and the mechanical angle of the steering wheel.

The relation between the rotation of the steering wheel 21 and the outputs of the first resolver 35 and second resolver 37 will be described with reference to FIG. 5.

The electric angle θT1e obtained from the first resolver 35 has five peak points per a single turn (360°) of the steering wheel 21. The reason is that the first resolver 35 has five electrode pairs, that is, electrically five pairs of N electrodes and S electrodes so that it is capable of outputting an electric angle corresponding to 3600×5=1800° to a mechanical angle of 360°. That is, the first resolver 35 has a resolution capacity which is five times that of a resolver having an electric angle of 360°.

Further, the electric angle θT2e of the second resolver 37 has six peak points per a single turn (360°) of the steering wheel 21. The reason is that the second resolver 37 has six electrode pairs, that is, electrically six pairs of the N electrodes and the S electrodes so that it is capable of outputting an electric angle corresponding to 360°×6=2160° to a mechanical angle of 360°. That is, the second resolver 37 has a resolution capacity which is six times that of a resolver having an electric angle of 360°.

The first resolver 35 outputs the electric angle θT1e as a resolver output signal and the second resolver 37 outputs the electric angle θT2e as a resolver output signal. However, the both signal waveforms never obtain the same value to the same rotation angle of the steering wheel 21 as evident from FIG. 5. Thus, a high resolution mechanical angle θTm can be obtained to a single turn of the steering wheel 21 by arithmetic operation by the ECU 60 based on the electric angle θT1e of the first resolver 35 and the electric angle θT2e of the second resolver 37.

Next, detection of torque based on the resolver signals outputted from the first and second resolvers 35, 37 will be described.

If the steering wheel 21 is steered by a vehicle driver or other people so that the input shaft 23a of the pinion shaft 23 is rotated at a rotation angle θ1, two kinds of alternate currents E2, E3 each having a different phase are outputted from the first resolver 35 and these satisfy the relation between following expressions (1) and (2).

$$E2 = K \cdot E1 \times \cos\theta \quad (1)$$

$$E3 = K \cdot E1 \times \sin\theta \quad (2)$$

where K means transformation ratio.

The angle θ can be computed from the expressions (1), (2) and this angle θ is a rotation angle θ1 of the input shaft 23a of the pinion shaft 23. On the other hand, if the input shaft 23a is rotated, the output shaft 23b of the pinion shaft 23 is rotated through the torsion bar 31. Thus, the rotation angle θ2 of the output shaft 23b can be computed based on the above-described expressions (1), (2) from the second resolver 37 provided on the side of the output shaft 23b.

When the input shaft 23a and the output shaft 23b of the pinion shaft 23 are rotated, a relative rotation angle difference $\Delta\theta(=\theta1-\theta2)$ is generated between the input shaft 23a and the output shaft 23b due to torsion of the torsion bar 31. Consequently, a steering torque T can be computed from the relative rotation angle difference $\Delta\theta$ which is a torsion angle of this torsion bar 31 and the stiffness of the torsion bar 31. Because the well known assist control is carried out by the ECU 60 in order to assist the steering force corresponding to this steering torque T, the steering by a vehicle driver can be assisted by a steering force generated by the motor 40.

Detection of the rotation angle (hereinafter referred to as "motor rotation angle") of the motor shaft 43 based on a resolver signal outputted from the motor resolver 44 will be explained as follows.

If AC voltage E1 is applied to the motor resolver 44 when the motor shaft 43 is rotated at a certain rotation angle, AC voltages E2, E3 are outputted corresponding to the applied voltage and rotation angle. The motor rotation angle can be computed from the applied AC voltage E1 and the outputted AC voltages E2, E3 according to the expressions (1), (2). Such detected motor rotation angle is used for various kinds of controls for the electrically driven steering apparatus 20.

The absolute position detection processing of the steering wheel 21 in the electrically driven steering apparatus 20 having such a structure will be described with reference to flow charts shown in FIGS. 6–10.

As described with reference to FIG. 4, the first resolver 35, the second resolver 37 and the motor resolver 44 are connected electrically to the ECU 60. The first and second resolvers 35, 37 are capable of detecting the steering angles (electric angles $\theta T1e$, $\theta T2e$) by the steering wheel 21 and the motor resolver 44 is also capable of detecting a motor rotation angle (electric angle $\theta Me$) of the motor 40. Thus, according to this embodiment, a processing for detecting the absolute position of the steering wheel 21 based on the electric angles $\theta T1e$, $\theta T2e$, $\theta Me$ of the resolver output signal outputted from these three resolvers (hereinafter referred to as absolute position detection processing) is carried out. This absolute position detection processing is executed just after the ignition ON and after that, the parameter A (hereinafter referred to just as A) is updated periodically (for example, every 5 milliseconds) by timer interruption and the like based on a parameter A (A=1, 0, −1, −2) indicating the rotation range of the steering wheel 21 obtained by this absolute position detection processing.

Figure 7:
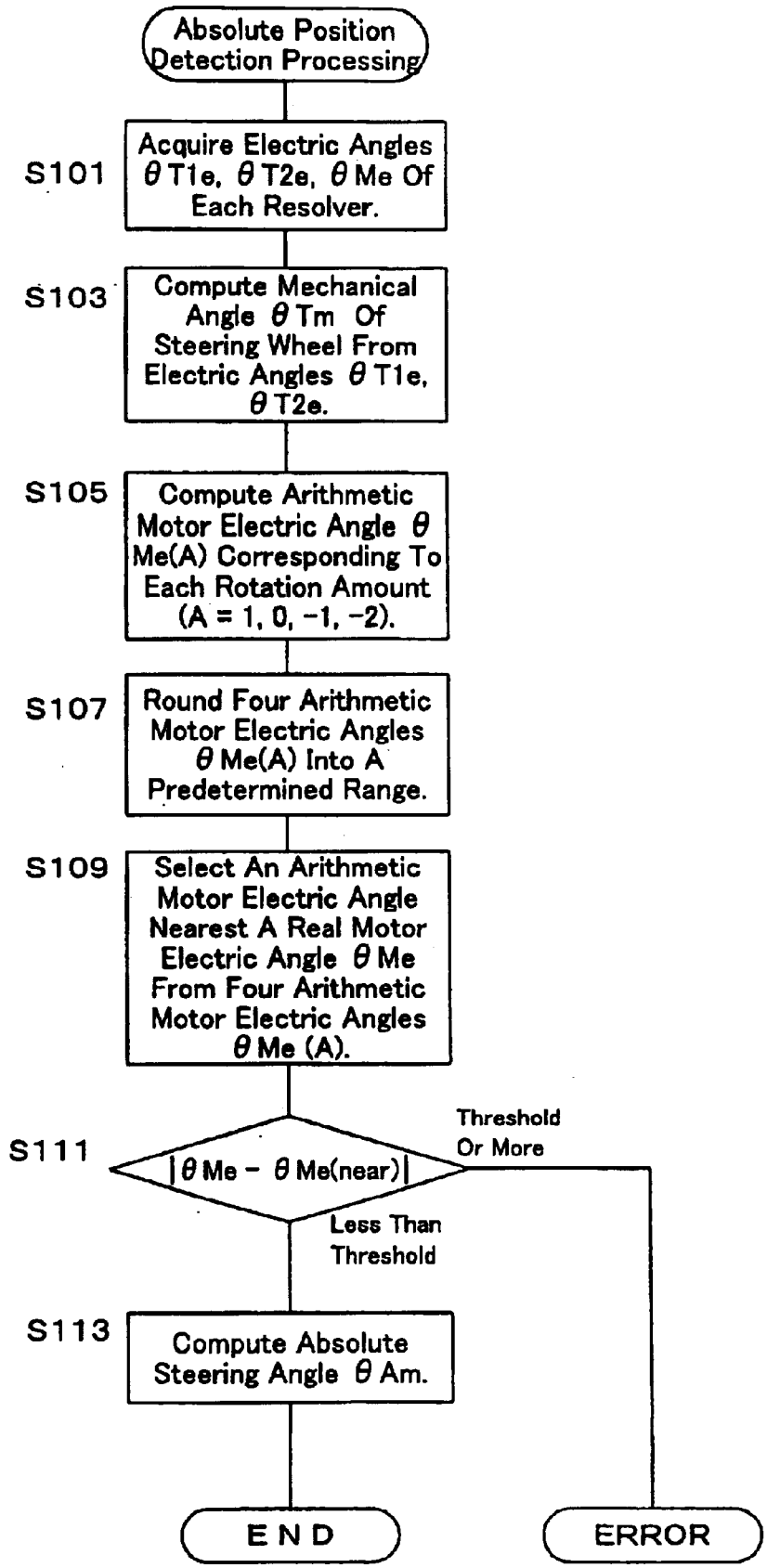
FIG. 7 is a flow chart showing the flow of the absolute position detection processing during the steering angle arithmetic operation processing shown in FIG. 6(A)

The ECU 60 determines whether or not ignition is ON (S90 in FIG. 6(A)). When the ignition is ON (S90: Yes), the absolute position detection processing is carried out because the absolute position of the steering wheel 21 is not clear (S100). In the absolute position detection processing, a processing for acquiring the electric angles $\theta T1e$, $\theta T2e$, $\theta Me$ of the respective resolvers is carried out in step S101 after a predetermined initialization processing as shown in FIG. 7 indicating the subroutine of that processing. The electric angles $\theta T1e$, $\theta T2e$ corresponding to the steering angle of the steering wheel 21 are acquired through the resolver signals outputted from the first and second resolvers 35, 37 while the electric angle $\theta Me$ corresponding to the motor rotation angle of the motor 40 is acquired through a resolver signal outputted from the motor resolver 44.

In subsequent step S103, a processing for computing the mechanical angle $\theta Tm$ of the steering wheel 21 from the electric angles $\theta T1e$, $\theta T2e$ is carried out. That is, because according to this embodiment, the first resolver 35 and the second resolver 37 are set to 5 and 6 respectively in the number of electrode pairs, the mechanical angle $\theta Tm$ of the steering wheel 21 can be computed based on the electric angles of the two resolvers each having a difference number of electrode pairs. In the meantime, this arithmetic operation processing has been described in detail in the applied specification of Japanese Patent Application Laid-Open No.2002-196131, which is desired to be referred to, by this applicant.

In next step S105, a processing for computing a arithmetic motor electric angle $\theta Me$ (A) to each rotation amount (A=1,0, −1, −2) is carried out. It is assumed that the range of a single turn (0°<$\theta$≦360°) in the right direction of the steering wheel is A=0, the range of a single turn (360°<$\theta$≦720°) further in the right direction is A=1, the range of a single turn (0°>$\theta$≧−360°) in the left direction with respect to the neutral position is A=−1 and the range of a single turn (−360°>$\theta$≧−720°) further in the left direction is A=−2 and four arithmetic motor electric angles $\theta Me(1)$, $\theta Me(0)$, $\theta Me(−1)$, $\theta Me(−2)$ corresponding to A=1, 0, −1, −2 are computed by arithmetic operation based on a following expression (3). That is, in this step S105, a processing for obtaining the arithmetic motor electric angle $\theta Me$ (A) for total rotation number of the steering wheel 21 (corresponding to four turns of the steering wheel in this embodiment) is carried out.

$$\theta Me(A)=(\theta Tm+360\times A)\times r \quad (3)$$

r must be an arithmetic value which is a product between the reduction gear ratio of the ball screw mechanism 50 and the number of electrode pairs in the motor resolver 44 and at least a non-integer value having a number below the decimal point as described later. Because according to this embodiment, the reduction gear ratio of the ball screw mechanism 50 is set to 8.2 and the number of electrode pairs in the motor resolver 44 is set to 7, the arithmetic value is 57.4 (=8.2×7), so that it has 0.4 as its number below the decimal point.

In step S107, a processing of rounding the four arithmetic motor electric angles $\theta Me$ (A) to a predetermined range is carried out. That is, a processing of computing on $\theta Me$ (A)−INT ($\theta Me$(A)/360)×360 is carried out so that the arithmetic motor electric angle $\theta Me$ (A) which is computed in step S105 falls under a range of 0° and more to less than 360°. Here, INT( ) is a function for rounding off a number in the parentheses to an nearest integer. For example, INT(8.9)=8 and INT (−8.9)=−9.

For example, if the arithmetic motor electric angle $\theta Me$ (−2) is −80°, it is converted and rounded off to 280°(=−80°−(−360°)), if the arithmetic motor electric angle $\theta Me$ (1) is 380°, 20°(=380+−1×360°), if the arithmetic motor electric angle $\theta Me$ (2) is −400°, 320° (=−400°−(−720°)).

In subsequent step S109, a processing of selecting an angle nearest an actual motor electric angle $\theta Me$ (hereinafter referred to as real motor electric angle $\theta Me$ in order to distinguish from the arithmetic motor electric angle $\theta Me$ (A)) from the four arithmetic motor electric angles $\theta Me$ (A) is carried out. That is, because any one of the four arithmetic motor electric angles $\theta Me$ (A) corresponding to the total rotation number of the steering wheel 21 acquired in steps S105, S109 is an arithmetic motor electric angle $\theta Me$ (near) which indicates the absolute position of the steering wheel 21, a processing for selecting this is carried out in this step S109.

Although the processing of this step S109 may be replaced with a processing of selecting an arithmetic motor electric angle $\theta Me$ (A) nearest an integer value from all the arithmetic motor electric angles $\theta Me$ (A) computed in steps S105, S109 as described in the applied specification of Japanese Patent Application Laid-Open No. 2002-196131 by this inventor, according to this embodiment, a processing of selecting an electric angle nearest the real motor electric angle θMe detected by the motor resolver 44 is carried out. As a result, a difference between the real motor electric angle θMe obtained in step S101 and all the arithmetic motor electric angles θMe(A) is computed and the electric angle θ having the smallest difference is selected as the arithmetic motor electric angle θMe (near). Thus, the algorithm of the step S109 can be simplified as compared to the processing of selecting one nearest the integer value.

In step S111, a processing for determining whether or not the arithmetic motor electric angle θMe(near) selected in step S109 is really appropriate is carried out. If a difference between the arithmetic motor electric angle θMe (near) and the real motor electric angle θMe is larger than a predetermined threshold (for example, 100) although the arithmetic motor electric angle θMe (near) is selected as one nearest the real motor electric angle θMe detected by the motor resolver 44, a probability that dimensional error of mechanical parts constituting the pinion shaft 23, rack shaft 24, the ball screw mechanism 50 and the like due to abrasion or dimensional accuracy or temperature characteristic error of a semiconductor electric parts such as an operational amplifier for processing resolver signals may exceed its tolerable value is high. Therefore, in such a case, a series of the absolute position detection processing is abnormally terminated to notify that an abnormality has occurred(ERROR).

On the other hand, if the difference between the arithmetic motor electric angle θMe (near) and the real motor electric angle θMe is less than the predetermined threshold, no special abnormality is noticed in the mechanical parts constituting the pinion shaft 23, the rack shaft 24, the ball screw mechanism 50 and the like or the semiconductor electric parts such as an operational amplifier for processing the resolver signal, the processing proceeds to step S113 in which a processing of computing an absolute steering angle θAm is executed.

In step S113, the absolute steering angle θAm is computed by substituting A (A is any one of 0, 1, −1, −2 in this embodiment) of the arithmetic motor electric angle θMe (near) selected in step S109 to a following expression (4) and executing arithmetic operation based on the mechanical angle θTm of the steering wheel 21 computed in step S103. Consequently, the absolute position of the steering wheel 21 is detected and then, a series of the absolute position detection processing (S100) is normally terminated.

$$\theta Am = \theta Tm + 360 \times A \quad (4)$$

After the absolute steering angle (mechanical angle) θAm is obtained by the above-described absolute position detection processing (S100), the electric angle rotation number Nt1 of the first resolver, the electric angle rotation number Nt2 of the second resolver and the electric angle rotation number Nm of the motor resolver are acquired from the absolute steering angle (mechanical angle) θAm according to expressions in the Figure.

where P1: axial double angle of the first resolver (=5)
P2: axial double angle of the second resolver (=6)
Pm: axial double angle of the motor resolver (=7)
Mrev: motor rotation number when the handle is rotated by a single turn.

In S130, a previous value(an electric angle past memory θT1eo of the first resolver) is stored as the electric angle θT1e of the first resolver, a previous value (an electric angle past memory θT2eo of the second resolver) is stored as the electric angle θT2e of the second resolver and a previous value (electric angle past memory θMeo of the motor resolver) is stored as the electric angle θMe of the motor resolver and then, a processing for setting up the initial value at the time of ignition ON (S90: Yes) is terminated.

Normal processing (S140) is periodically (for example, every 10 ms) carried out after the ignition ON (S90: No). As shown in FIG. 6(B), the electric angle rotation numbers (0–360 deg) of the first resolver 35, the second resolver 37 and the motor resolver 44 are updated by incrementing or decrementing them (S200). The steering angles are computed from the electric angle rotation numbers of the first resolver 35, the second resolver 37 and the motor resolver 44 and then, by majority operation upon the computed steering angles, a trouble in the rotation angle sensor is detected (S300). The electric angle rotation number is updated based on the steering angle determined by that majority operation upon the rotation sensor in trouble (S400).

Figure 8:
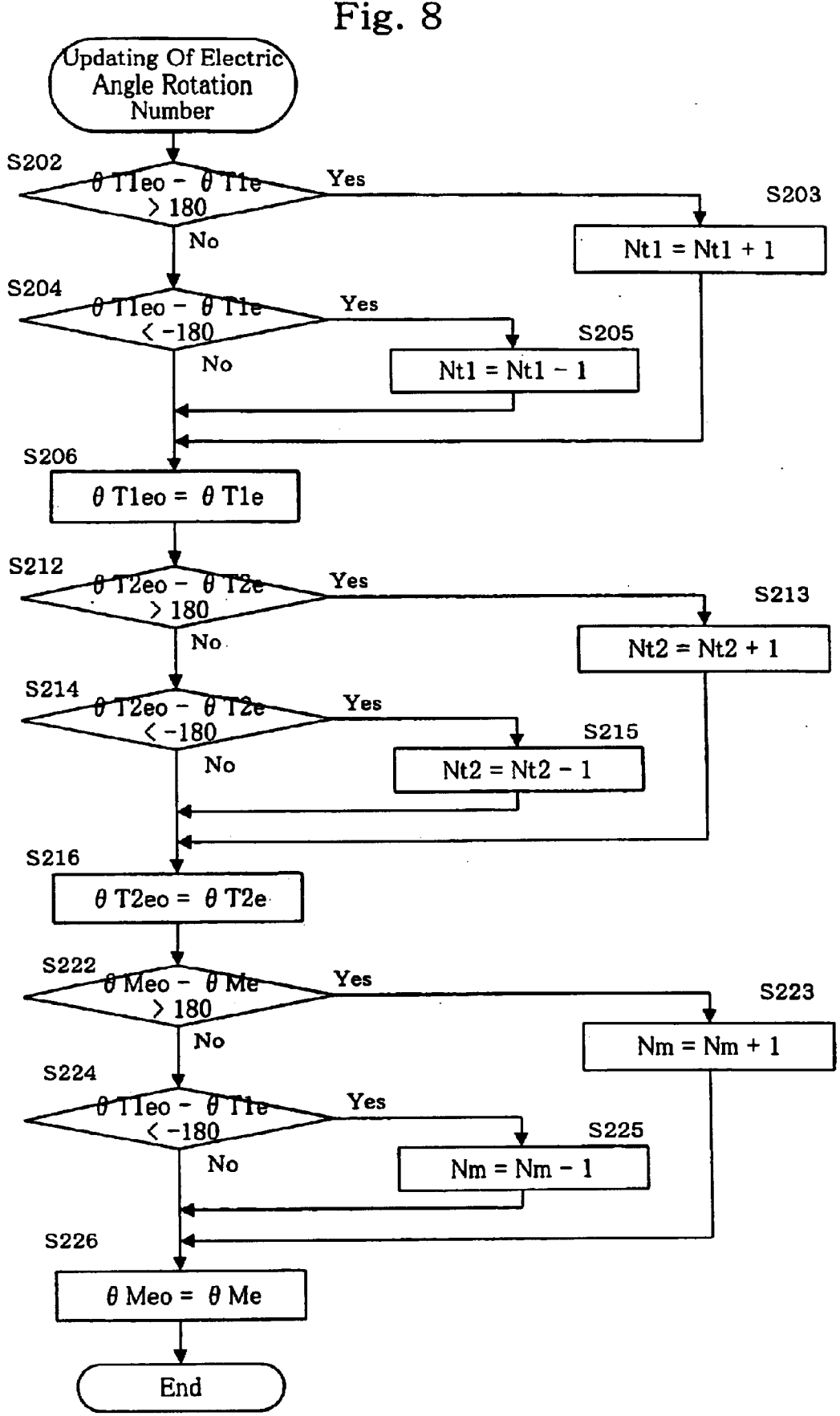
FIG. 8 is a flow chart showing the subroutine of electric angle rotation number update processing during the ordinary processing shown in FIG. 6(B)

The processing (S200) for updating the electric angle rotation numbers of the first resolver 35, the second resolver 37 and the motor resolver 44 will be described with reference to FIG. 8 showing its subroutine.

Whether or not the electric angle of the first resolver 35 is rotated by a single turn in the right direction (to the right direction with respect to the rotation direction of the steering wheel) is determined depending upon whether or not the electric angle past memory θT1eo of the first resolver 35 minus the electric angle θT1e of the first resolver is more than 180 (S202). For example, if the previous electric angle is 356 deg and the current electric angle is 2 deg, it comes that 356−2=354, which is larger than 180 and therefore, it is determined that the electric angle is rotated by a single turn in the right direction. 180 is set up as a threshold because the electric angle is not moved by as large as 180 deg in the unit time (10 ms). If a result of that subtraction is larger than 180 (S202: Yes), 1 is added to the electric angle rotation number Nt1 of the first resolver (increment) in S203 and the previous value (electric angle past memory θT1eo of the first resolver) is updated to the electric angle θT1e of the first resolver by incrementing 360 deg (S206).

On the other hand, if a result value after the subtraction is smaller than 180 (S202: No), whether or not the electric angle of the first resolver 35 is rotated by a single turn in the left direction (to the left side with respect to the rotation direction of the steering wheel) is determined depending on whether or not a value produced by subtracting the electric angle θT1e of the first resolver from the electric angle past memory θT1eo of the first resolver is smaller than −180 (S204). For example, if the previous electric angle is 2 deg while the current electric angle is 357 deg, it is determined that the electric angle is rotated by a single turn in the left direction because 2−357=−355, which is smaller than −180. Here, if a value after the subtraction is smaller than −180 (S204: Yes), in S205, 1 is decremented from the electric angle rotation number Nt1 of the first resolver and the previous value (electric angle past memory θT1eo of the first resolver) is updated to the electric angle θT1e of the first resolver which is decremented by 360 deg (S206). On the other hand, if the value after the subtraction is larger than −180 (S204: No), the previous value (electric angle past memory θT1eo of the first resolver) is updated to the current electric angle θT1e of the first resolver (S206).

The electric angle is updated also for the second resolver 37. In S212, whether or not the electric angle of the second resolver 37 is rotated by a single turn in the right direction is determined and if it is rotated by a single turn in the right direction (S212: Yes), the electric angle rotation number Nt2 of the second resolver 37 is incremented by 1 in S213 and the previous value (electric angle past memory θT2eo of the second resolver) is updated to the electric angle θT2e of the second resolver which is incremented by 360 deg (S216). If it is not rotated by a single turn in the right direction (S212: No), whether or not the electric angle of the second resolver 37 is rotated by a single turn in the left direction is determined (S214). If it is determined that the electric angle is rotated by a single turn in the left direction (S214: Yes), the electric angle rotation number Nt2 of the first resolver is decremented by 1 in S215 and after that, the previous value (electric angle past memory θT2eo of the first resolver) is updated to the electric angle θT2e of the second resolver, which is decremented by 360 deg (S216). On the other hand, if the rotation region of the electric angle is not changed (S214: No), the previous value (electric angle past memory θT2eo of the second resolver) is updated to the current electric angle θT2e of the second resolver.

The electric angle is updated for the motor resolver 44 also. In S222, whether or not the electric angle of the motor resolver 44 is rotated by a single turn in the right direction is determined and if it is rotated by a single turn in the right direction (S222: Yes), the electric angle rotation number Nm of the motor resolver 44 is incremented by 1 in S223. Then, the previous value (electric angle past memory θMeo of the motor resolver) is updated to the electric angle θMe of the motor resolver, which is incremented by 360 deg (S206). Unless it is rotated by a single turn in the right direction (S222: No), whether or not the electric angle of the motor resolver 44 is rotated by a single turn is determined in the left direction (S224). If it is determined that the electric angle is rotated by a single turn in the left direction (S224: Yes), the electric angle rotation number Nm of the motor resolver is decremented by 1 in S225 and after that, the previous value (electric angle past memory θMeo of the motor resolver) is updated to the electric angle θMe of the motor resolver 44 which is decremented by 360 deg (S226). On the other hand, unless the rotation region of the electric angle is changed (S224: No), the previous value (electric angle past memory θMeo of the motor resolver) is updated to the current electric angle θMe of the motor resolver (S226).

Figure 9:
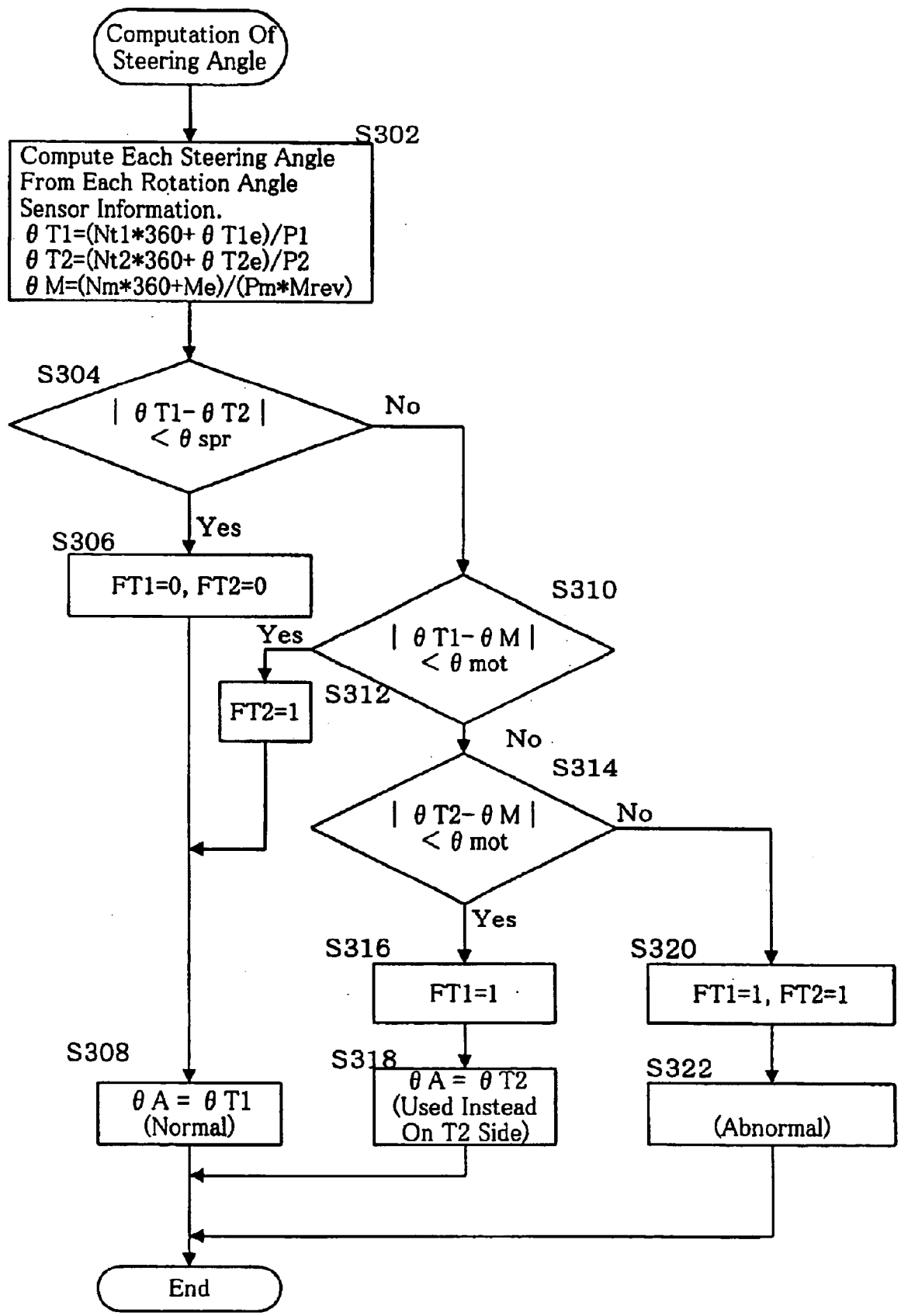
FIG. 9 is a flow chart showing the flow of the steering angle arithmetic operation processing during the steering angle arithmetic operation processing shown in FIG. 6(B)

Steering angle calculation processing (S300 in FIG. 6(B)) of detecting for a trouble in the rotation angle sensor by computing the steering angle from each of the electric angle rotation numbers of the first resolver 35, the second resolver 37 and the motor resolver 44 and executing the majority operation upon the computed steering angles will be described with reference to FIG. 9 indicating the subroutine thereof.

First of all, a first resolver side steering angle θT1 is computed based on the electric angle θT1e of the first resolver 35, the second resolver side steering angle θT2, based on the electric angle θT2e of the second resolver 37, and the motor side steering angle θM, based on the electric angle θMe of the motor resolver 44, according to expressions in the same Figure (S302).

Next, whether or not there occurs a trouble in either the first resolver 35 or the second resolver 37 is determined depending on whether or not a value obtained by subtracting the second resolver side steering angle θT2 from the first resolver side steering angle θT1 is smaller than a predetermined threshold (threshold θspr of deflection between θT1 and θT2) (S304). Here if there is no problem in the first resolver 35 or the second resolver 37 (S304: Yes), the normal/abnormal flag FT1 of the first resolver 35 and the normal/abnormal flag FT2 of the second resolver 37 are reset (0: normal) (S306). Then, the value of the first resolver side steering angle θT1 is made equal to the absolute steering angle θA and the processing is terminated (S308). That is, the steering angle is detected with the first resolver 35 at the normal time.

On the other hand, if a difference between the steering angle of the first resolver 35 and the steering angle of the second resolver 37 is larger than the deflection threshold θspr, there exists a problem in either the first resolver 35 or the second resolver 37 (S304: No). Thus, whether or not there exists any problem on the side of the second resolver 37 is considered depending on whether or not a value obtained by subtracting the motor side steering angle θM from the first resolver side steering angle θT1 is smaller than a predetermined threshold (threshold θmot of deflection between the torque sensor side steering angle and the motor side steering angle) (S310). Here, if the value after the subtraction is smaller than the threshold θmot and any trouble exists on the side of the second resolver 37 (S310: Yes), the normal/abnormal flag FT2 of the second resolver 37 is set (1: abnormal) (S312) and the processing proceeds to S308. In this step, the value of the first resolver side steering angle θT1 is made equal to the updated absolute steering angle θA and the processing is terminated.

On the other hand, If a problem exists on the side of the first resolver 35 (S310: No), whether or not any problem is generated on the side of the second resolver 37 is recognized (S314). This is determined depending on whether or not a value obtained by subtracting the motor side steering angle θM from the second resolver side steering angle θT2 is smaller than the deflection threshold θmot. If the value after the subtraction is smaller than the threshold θmot and the second resolver 37 is normal while abnormality exists in the first resolver 35 (S314: Yes), the normal/abnormal flag FT1 of the first resolver 35 is set (1: abnormal) (S316). Then, the updated absolute steering angle θA is adopted as the second resolver side steering angle θT2, that is, the steering angle detected by the second resolver 37 is adopted instead of the steering angle of the first resolver 35 and then, the processing is terminated (S318). On the other hand, if the value after the subtraction is smaller than the threshold θmot and abnormality exists in the second resolver 37 as well as the first resolver 35 (S314: No), the normal/abnormal flag FT1 of the first resolver 35 and the normal/abnormal flag FT2 of the second resolver 37 are set (1: normal) (S320). Then, the processing of the torque sensor, for example, a processing of reducing the assist torque gradually is carried out (S322). At this time, the electric angle rotation number Nt1 of the first resolver 35 can be set up based on the steering angle θM of the motor resolver 44.

Because in the electrically driven steering apparatus of the first embodiment, each steering angle is acquired using three rotation angle sensors (first resolver 35, second resolver 37 and motor resolver 44), the steering angle can be detected continuously even if any one is in trouble and by maintaining the functions of the ABS, VSC and the like, the safety in traveling can be intensified. Further, the majority operation is executed upon the steering angles detected with the three rotation angle sensors (first resolver 35, second resolver 37 and motor resolver 44). Because the steering angle is selected based on the result of the majority operation, whether or not the functions of the first resolver 35 and the second resolver 37 are appropriate can be always decided, thereby the reliability on the steering angle being intensified.

Figure 10:
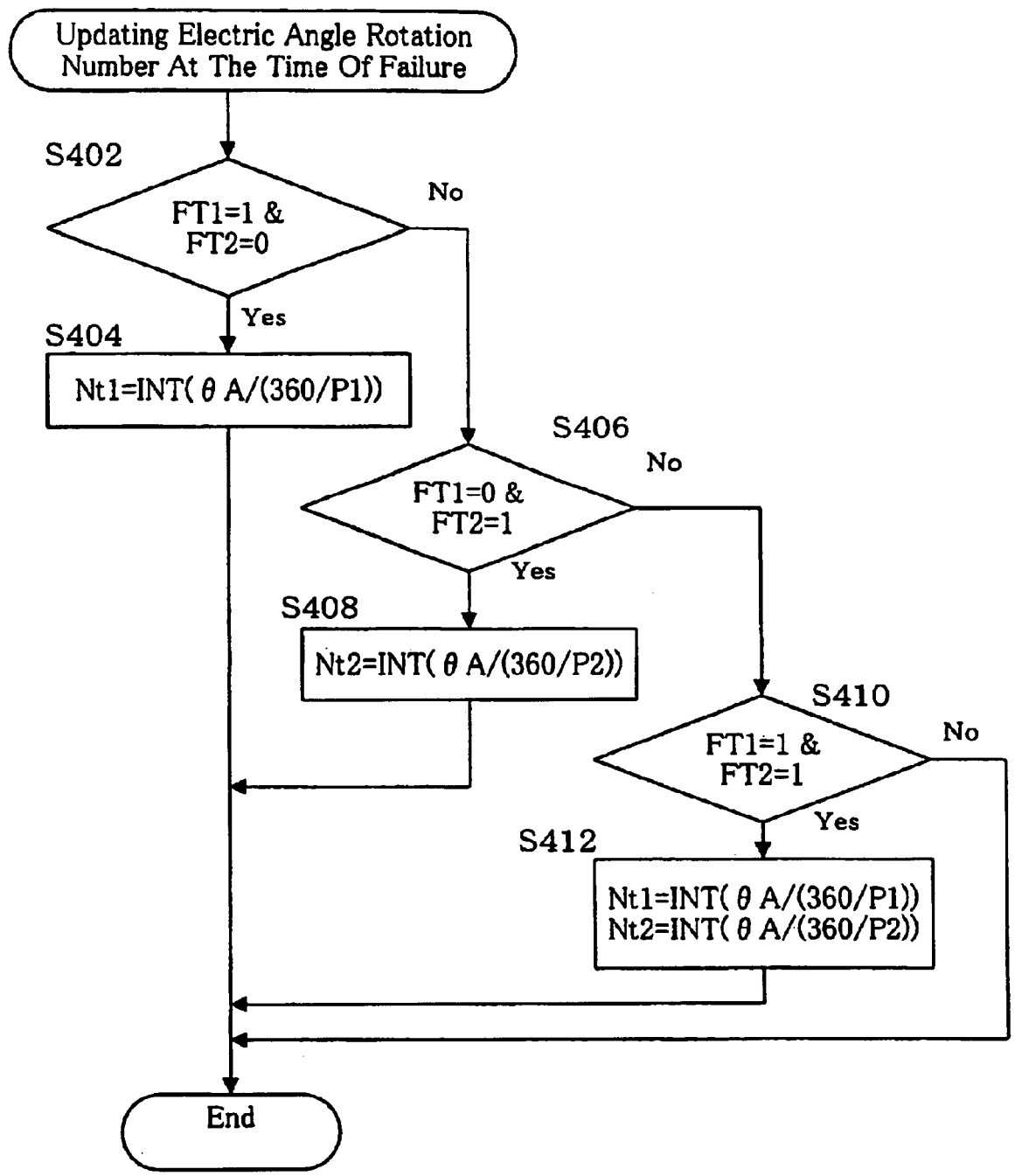
FIG. 10 is a flow chart showing the flow of the electric angle rotation number update processing during the steering angle arithmetic operation processing shown in FIG. 6(B).

The electric angle rotation number updating processing (S400 shown in FIG. 6(B)) at a trouble time for recovery of the first resolver 35 and the second resolver 37 in trouble, which is carried out for the first resolver 35 and the second resolver 37 in trouble by updating the electric angle rotation number based on a steering angle selected according to the majority operation, will be described with reference to FIG. 10 indicating the subroutine thereof.

First of all, whether or not the first resolver 35 is in trouble while the second resolver 37 is normal is determined depending on whether or not the first resolver normal/abnormal flag FT1 is 1 and the second resolver normal/abnormal flag FT2 is 0 (S402). If the first resolver 35 is in trouble while the second resolver 37 is normal (S402: Yes), the electric angle rotation number Nt1 of the first resolver 35 is computed according to the expression indicated in the same Figure based on the absolute steering angle θA (steering angle θT2 acquired from the second resolver 37, here) selected based on the majority operation as described above and then the electric angle rotation number Nt1 is updated with that obtained value (S404).

On the other hand, if the case where the first resolver 35 is in trouble while the second resolver 37 is normal is not present (S402: No), whether or not the first resolver 35 is normal while the second resolver 37 is abnormal is determined depending on whether or not the first resolver normal/abnormal flag Fr1 is 0 and the second resolver normal/abnormal flag FT2 is 1 (S406). If the first resolver 35 is normal while the second resolver 37 is abnormal (S406: Yes), the electric angle rotation number Nt2 of the second resolver 37 is computed according to the expression shown in the same Figure based on the absolute steering angle θA (steering angle θT1 acquired by the first resolver 35, here) selected based on the majority operation as described above and the electric angle rotation number Nt2 of the second resolver 37 is updated with that value (S408).

On the other hand, if the first resolver 35 is normal while the second resolver 37 is not abnormal (S406: No), whether or not both the first resolver 35 and the second resolver 37 are abnormal is determined depending on whether or not the first resolver normal/abnormal flag FT1 is 1 and the second resolver normal/abnormal flag FT2 is 1 (S410). If both the first resolver 35 and the second resolver 37 are abnormal (S410: Yes), the electric angle rotation number Nt1 of the first resolver 35 is computed according to the expression indicated in the Figure based on the absolute steering angle θA and then, the electric angle rotation number Nt1 is updated with the acquired value. Likewise, the electric angle rotation number Nt2 of the second resolver 37 is computed according to the expression in the same Figure based on the absolute steering angle θA and the electric angle rotation number Nt2 is updated with that acquired value (S412). As the absolute steering angle θA, it is permissible to use its past value not updated or an absolute steering angle θA set up based on the steering angle θM of the motor resolver 44.

In the electrically driven steering apparatus of this embodiment, the steering angle is acquired using a rotation number corresponding to the steering angle (absolute steering angle θA) selected as a result of the majority operation as well as a rotation angle detected by the resolver for the first resolver 35 or the second resolver 37 determined to be inappropriate. Thus, even if the rotation number counted temporarily in the first resolver 35 or the second resolver 37 becomes unclear because a short-circuit occurs in a moment due to a contact failure or the like, the steering angle can be always acquired by using a rotation number corresponding to a steering angle selected from the result of the majority operation. Thus, the steering angle can be acquired appropriately by restarting the counting on the first resolver 35 and the second resolver 37. For the reason, even if the first resolver 35 or the second resolver 37 turns into a trouble in a moment, control on the motor can be restarted by determining the assist amount appropriately if the first resolver 35 or the second resolver 37 is restored from that trouble. Further, the majority operation can be executed using all the three rotation angle sensors (the first resolver 35, the second resolver 37 and the motor resolver 44), thereby the reliability of the steering angle not being lowered.

In the structure described above, the absolute steering angle is acquired according to the priority order of the first resolver 35, the second resolver 37 and the motor resolver 44. The reason why the first resolver 35 is taken with the top priority is that that angle is the nearest the actual steering angle of the steering wheel. However, if an actual steering angle of the tire is needed as application of the absolute steering angle, the priority order may be the second resolver 37, the first resolver 35 and the motor resolver 44.

Although an example that the resolver is adopted as a rotation angle sensor has been indicated in the above embodiment, needless to say, the structure of the present invention can be applied to a rotation angle sensor using, for example, a slit plate or a photo interrupter.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. An electrically driven steering apparatus comprising:
   a steering wheel;
   a first rotation angle sensor for detecting a rotation angle of a steering shaft connected to the steering wheel;
   a second rotation angle sensor for determining an assist amount; a motor for assisting steering operation by a steering mechanism connected to said steering shaft;
   a third rotation angle sensor for detecting the rotation angle of the motor;
   means for acquiring steering angles according to each of rotation angles detected by said first rotation angle sensor, said second rotation angle sensor and said third rotation angle sensor;
   means for executing a majority operation of comparing the acquired steering angles according to said first rotation angle sensor, said second rotation angle sensor and said third rotation angle sensor and determining if one of the acquired steering angles is not consistent with the majority of the acquired steering angles; and
   means for selecting one of the acquired steering angles based on the result of the majority operation.

2. An electrically driven steering apparatus comprising:
   a steering wheel;
   a first rotation angle sensor for detecting the rotation angle of a steering shaft connected to the steering wheel;
   a second rotation angle sensor for detecting the rotation angle of said steering shaft through an elastic member;
   a motor for assisting the steering by the steering mechanism connected to said steering shaft;
   a third rotation angle sensor for detecting the rotation angle of the motor; and
   means for controlling said motor by determining an assist amount from a difference between the rotation angle detected by the first rotation angle sensor and the rotation angle detected by the second rotation angle sensor;

means for acquiring steering angles from the rotation angles detected by said first rotation angle sensor, said second rotation angle sensor and said third rotation angle sensor;

means for executing a majority operation by comparing the steering angles acquired according to said first rotation angle sensor, said second rotation angle sensor and said third rotation angle sensor and determining if one of the acquired steering angles is not consistent with the majority of the steering angles; and means for selecting one of said steering angles as a result of the majority operation.

3. An electrically driven steering apparatus comprising:

a steering wheel;

a first rotation angle sensor for detecting the rotation angle of a steering shaft connected to the steering wheel;

a second rotation angle sensor for detecting the rotation angle of said steering shaft through an elastic member;

a motor for assisting the steering by the steering mechanism connected to said steering shaft;

a third rotation angle sensor for detecting the rotation angle of the motor, means for controlling said motor by determining an assist amount from a difference between the rotation angle detected by the first rotation angle sensor and the rotation angle detected by the second rotation angle sensor;

means for acquiring a first steering angle from the rotation angle detected by said first rotation angle sensor and a counted rotation number of the steering wheel, a second steering angle from the rotation angle detected by said second rotation angle sensor and a counted rotation number of the steering wheel and a third steering angle from the rotation angle detected by said third rotation angle sensor and a counted rotation number of the motor;

means for executing a majority operation by comparing the acquired first, second and third steering angles and determining if one of the acquired first, second and third steering angles is not consistent with the majority of the acquired steering angles;

means for selecting one of said acquired steering angles as a result of the majority operation; and means for setting an absolute steering angle according to the selected one of the steering angles.

* * * * *